ID
3,516,808
PREPARATION OF CARBON DIOXIDE ACCEPTORS
BY THE MELT PROCESS
George P. Curran and Everett Gorin, Pittsburgh, Pa., assignors, by mesne assignments, of one-half each to Consolidation Coal Company, Library, Pa., and the United States of America as represented by the Secretary of the Interior
Filed July 19, 1968, Ser. No. 746,205
Int. Cl. C10k 1/00, 1/20
U.S. Cl. 48—197
10 Claims

ABSTRACT OF THE DISCLOSURE

Lime, which has become inactive for the purpose of removing undesirable $CO_2$ by-product from chemical reactions, is hydrated to $CA(OH)_2$. The $Ca(OH)_2$ is then mixed with $CaCO_3$ and/or CaO, and the mix is heated to a molten state in the presence of steam at an elevated pressure sufficiently high to prevent dehydration of $CA(OH)_2$. After solidfying the melt, the $Ca(OH)_2$ therein is calcined to CaO, which is, at this point, an active material fcr removing undesirable $CO_2$.

---

This invention, which relates to the production of $CO_2$ acceptors, resulted from work done under contract with the Office of Coal Research of the U.S. Department of the Interior, and domestic title to the invention is in the government, in accordance with the requirements of the Coal Research Act (30 U.S.C. 661–668).

Carbon dioxide $(CO)_2$ is produced as an undesirable by-product in many processes. In some of these processes, it is desirable to remove the $CO_2$ as fast as it is formed. An example is the steam-carbon reaction which yields carbon monoxide (CO), methane $(CH)_4$ and hydrogen $(H_2)$, as well as undesirable $CO_2$. For the purpose of $CO_2$ removal, solids which readily react with $CO_2$ may be used directly in the reaction zone, provided they do not react with the other reactants. Such solids are sometimes called "$CO_2$ acceptors."

Due to its generally high effectiveness and low cost, lime (CaO) is one of the more favored $CO_2$ acceptors. During $CO_2$ removal, the CaO exothermically reacts with $CO_2$ to form $CaCO_3$ which must ultimately be reconverted or regenerated to CaO. Heretofore, such regeneration has been accomplished by heating the carbonate at an elevated temperature to form CaO for recycle and $CO_2$ gas which is discharged. U.S. Pat. No. 2,705,672 describes such a regeneration procedure.

Our experiments have clearly shown that the lime regenerated in this manner undergoes progressive decline in its ability to absorb $CO_2$ despite, or because of, its repeated cycling through the regeneration process. The decline in activity may be attributed to growth in crystallite size of the CaO, with consequent progressive reduction in pore volume on recycling through the $CO_2$ removal step and associated regeneration step. In any case, the lime finally reaches the point where it is essentially inert so far as absorption of $CO_2$ is concerned.

We have now discovered that such CaO, which has reached a point where it is essentially inert as a $CO_2$ acceptor, can be converted to highly active CaO by the following process:

(1) The inactive CaO is converted to $Ca(OH)_2$ by suitable water treatment, thusly: $CaO + H_2O \rightarrow Ca(OH)_2$.

(2) A mixture of the $Ca(OH)_2$ and either CaO or $CaCO_3$ or both is heated to a molten state in the presence of steam at an elevated pressure sufficiently high to prevent dehydration of the $Ca(OH)_2$ during melting. A eutectic composition is thereby formed between the $Ca(OH)_2$ and other ingredients.

(3) The eutectic is cooled to a solid state.

(4) The solid eutectic composition ($Ca(OH)_2 \cdot CaCO_3$ or $CaO \cdot Ca(OH)_2$ or $CaO \cdot Ca(OH)_2 \cdot CaCO_3$, as the case may be) is calcined to convert the $Ca(OH)_2$ to CaO, which is, at this point, an active $CO_2$ acceptor.

It is therefore an object of the present invention to provide an active $CO_2$ acceptor from CaO which has become inert by frequent use and regeneration, or which, in its natural state, is not satisfactorily active. Other objects and advantages will be obvious from the detailed description of the invention in the following specification taken in conjunction with the drawings wherein.

In the practice of the invention inactive lime is first converted to $Ca(OH)_2$ by treatment with $H_2O$. This can be done by contacting the lime with high pressure steam (the higher the pressure, the faster the reaction rate) or with water at a temperaure of about 300° to about 400° F. and under elevated pressure to maintain the water in a liquid state.

Figure 1:
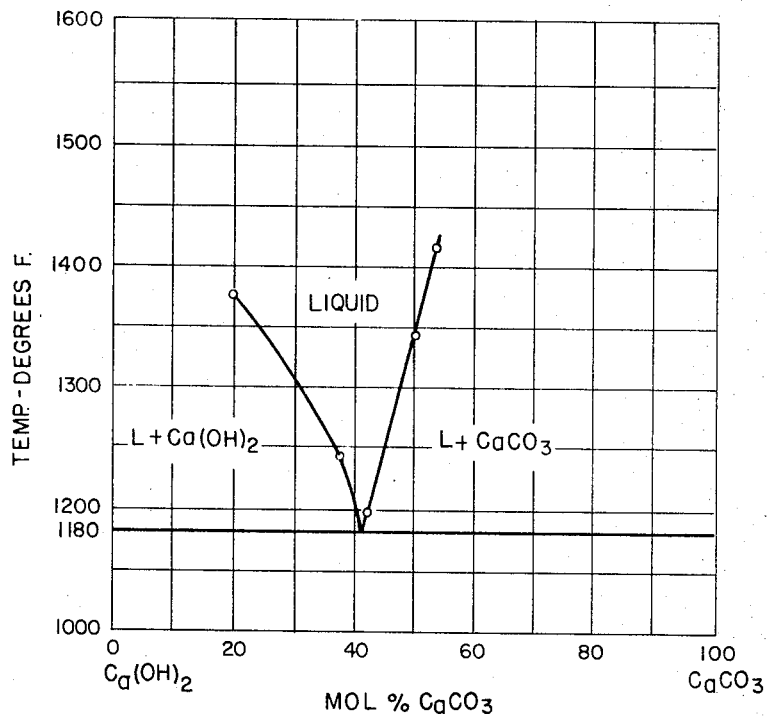
FIG. 1 is a phase diagram for the system $Ca(OH)_2 \cdot CaCO_3$.
Figure 2:
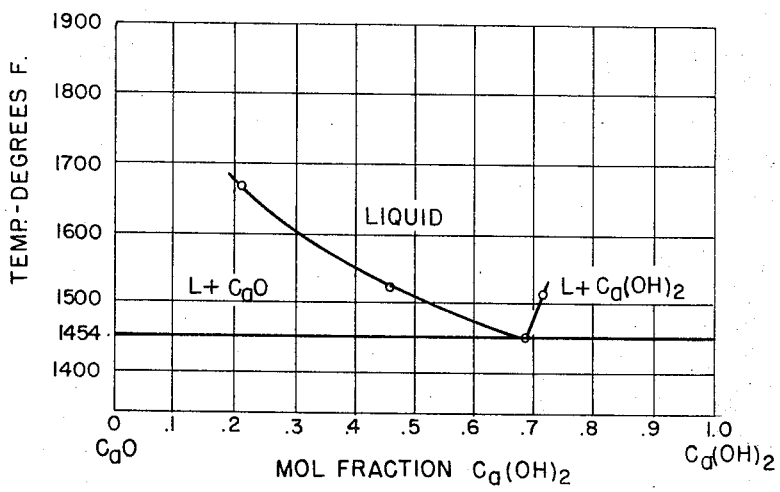
FIG. 2 is a phase diagram for system $CaO \cdot Ca(OH)_2$.

Thereafter, the $Ca(OH)_2$ is mixed with $CaCO_3$ and/or CaO. In order to operate with compositions of the lowest possible melting points, it is obviously desirable to regulate the proportions of the components $Ca(OH)_2$, CaO, and/or $CaCO_3$ to conform to those of the desired eutectic, although our process will still achieve substantial improvements in activity despite substantial deviation from the eutectic proportions. The specific eutectic compositions for $Ca(OH)_2 \cdot CaCO_3$ and $CaO \cdot Ca(OH)_2$ are shown in FIGS. 1 and 2, respectively. As for the system $CaO \cdot Ca(OH)_2 \cdot CaCO_3$, we have not presently determined the specific proportions of the euteic composition. However, we have determined that a mixture of these three components exists as a liquid over a temperature range of 1000° to 1700° F.

When $CaCO_3$ is to be mixed with the $Ca(OH)_2$, the lime hydration and mixing steps can be performed simultaneously. That is, the inactive CaO is treated with steam in the presence of $CaCO_3$. The mole ratio of $Ca(OH)_2$ to $CaCO_3$ (a mole ratio of 1:1 is preferred) can be adjusted to any desired value during this treatment by adding $CO_2$.

Whatever hydration and mixing techniques are employed, the mixture of $Ca(OH)_2$ with $CaCO_3$ and/or CaO is then heated to a temperature sufficient to melt the mix, in the presence of steam under high pressure to prevetn dehydration of the hydroxide. Steam pressures of about 9–30 atmospheres (absolute) are suitable.

The molten mixture is allowed to cool, whereby a eutectic solid is formed. After cooling, the solid is formed into a finely divided state. This can be accomplished by simply allowing the molten mixture to crystallize to a solid mass which is then ground and screened to recover the desired particle size suitable for subsequent use in a gasification plant wherein $CO_2$ is removed; or the molten mixture is allowed to drop through a cooling tower to form uniformly sized particles. Another solidifying arrangement is to spray the melt into an immiscible liquid in which a temperature gradient is maintained such that the liquid drops freeze before passing out of the liquid. As an example, the melt could be sprayed upwardly through a bath of molten lead.

After solidification, the finely divided composition is subjected to low temperature dehydration at about 1000 to 1200° F. and atmospheric pressure to convert the $Ca(OH)_2$ to CaO, which resultant material can then be employed as the $CO_2$ acceptor. As such, it has been found not only to be an active $CO_2$ acceptor, but also to be physically strong so as to withstand many successive regenerations before a repeat of the process of this invention must be resorted to.

It is considered to be within the framework of the process of the present invention to blend various additives with the melt. Some additives such as various other acidic oxides, carbonates, phosphates, including by way of illustration, $P_2O_5$, $B_2O_3$, $SiO_2$, $Al_2O_3$, $Na_2CO_3$, act as stabilizers to inhibit CaO crystal growth. Other additives act as catalysts for the reactions in which the $CO_2$ acceptors are used.

Figure 3:
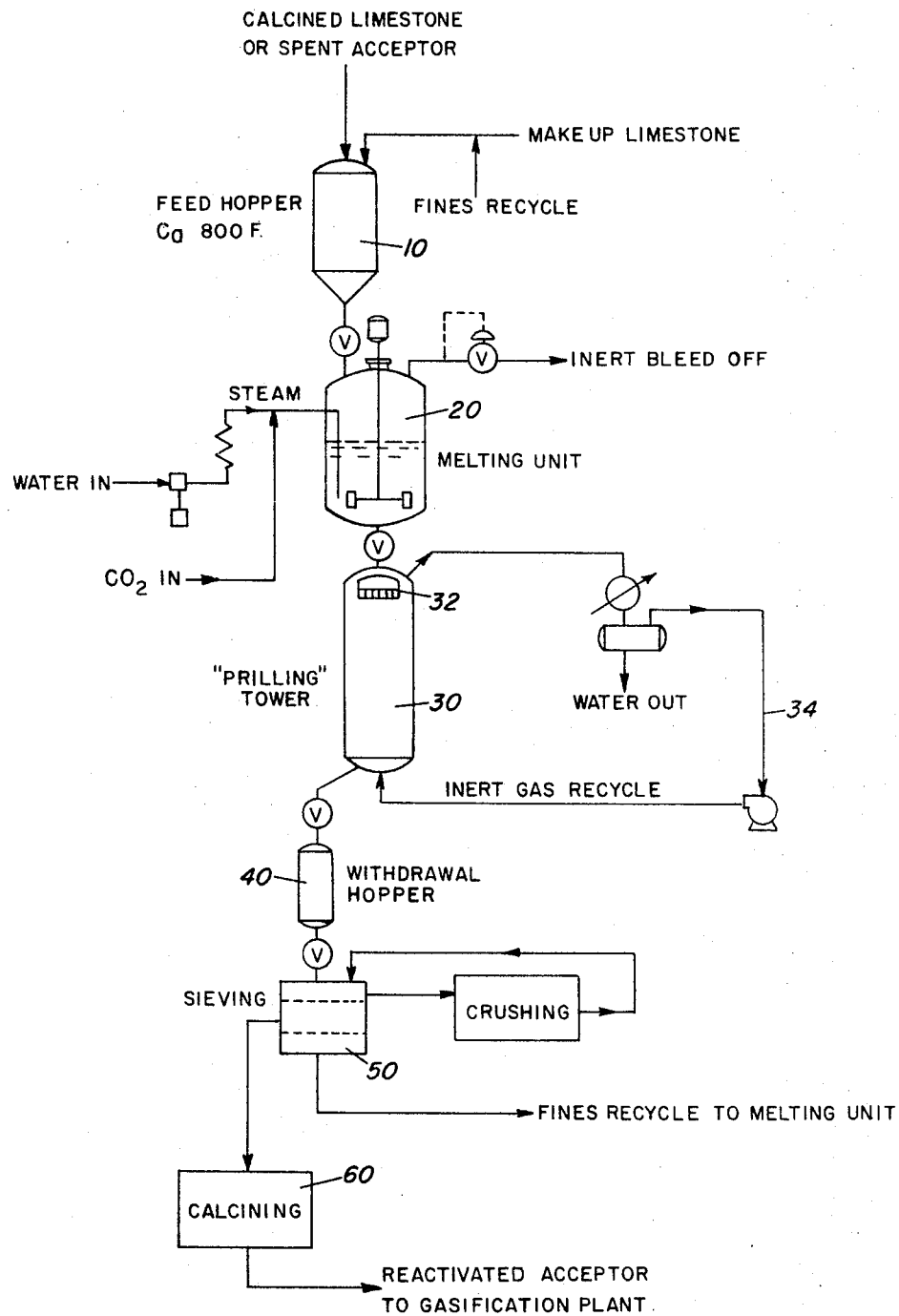
FIG. 3 is a flow diagram of a reactivator plant for spent $CO_2$ acceptor.

A generalized type flowsheet which illustrates how the process can be conducted in practice is shown in FIG. 3. Spent coarse acceptor, attrited acceptor fines, recycle fines from crushing and sizing of the melt, fresh limestone and any combination of the above materials can be employed as feed in the process. Although the flowsheet is shown for a continuous operation, batchwise operation is obviously suitable.

Referring to the figure, a mixture of $CaCO_3$ (from either spent acceptor or calcined limestone) is present in feed hopper 10. From the hopper the feed mixture is fed to a melting unit 20 which is a pressurized stirred reactor to which a mixture of steam and $CO_2$ under pressure at about 350–1000 p.s.i.g. is also fed. CaO therein is converted to $Ca(OH)_2$ by reaction with steam while a portion is converted to $CaCO_3$ by reaction with $CO_2$. In order to give the desired proportions of $Ca(OH)_2$ and $CaCO_3$ in the melt product, i.e. about 50 mole percent of each, the relative amounts of steam and $CO_2$ are appropriately adjusted. If the solid charge in hopper 10 is preheated to about 600–800° F., the exothermic heats of the hydration and carbonation reactions are sufficient to achieve the desired melting temperatures which are of the order of 1200–1400° F.

Melted acceptor is then transferred to a prilling tower 30 through a sprayhead device 32. The molten spray is converted to a steady stream of droplets of predetermined size suitable for ultimate use as a $CO_2$ acceptor (e.g., 8 to +28 mesh). By means of a circulation system 34, an inert gas passes upwardly through the tower countercurrent to the molten droplets. The endothermic reaction of the partial dehydration of $Ca(OH)_2$ is sufficient to freeze or solidify the droplets.

Frozen melt droplets are withdrawn to a hopper 40, and thence to a sieving and crushing system 50. Undersize material from crushing and sizing is returned to the melting unit, while oversize material is recrushed. Desirably sized material is sent to a calcining unit 60 where the acceptor is calcined at about 1000–1200° F. and atmospheric pressure to convert the $Ca(OH)_2$ to CaO before it is sent to a gasification plant wherein the $CO_2$ is to be removed.

The following examples illustrate the effectiveness of the process of the present invention:

EXAMPLE A

Fresh South Dakota limestone ($CaCO_3$) was calcined to form lime and then split into two portions. One portion was marked as Sample A. The other portion was converted to $Ca(OH)_2$ by treatment with hot water (liquid) at 300° F. for 1 hour. Thereafter the $Ca(OH)_2$ was mixed with varying predetermined amounts of fresh natural $CaCO_3$ and each mix was heated to molten form in an autoclave in the presence of steam. The systems were held at about 1350° and 350 p.s.i.g. for about 20 minutes to insure complete melting, and then cooled at a rate of 5° F. per minute to just below the $CaCO_3 \cdot Ca(OH)_2$ eutectic temperature (1180° F.) and then rapidly cooled to room temperature.

The resultant solid mass was then crushed and sized to 14 x 48 mesh, and heated in $N_2$ at 1600° F. in a fluidized bed reactor. This heating operation dehydrated the $Ca(OH)_2$ to CaO, and decomposed the $CaCO_3$ to CaO. Thereafter, the material, which was now all CaO, was marked as Samples B and C.

Reagent grade $CaCO_3$ and $Ca(OH)_2$ were mixed together in varying proportions, and the mixes were melted, solidified, comminuted and calcined completely to CaO in the same manner as that for the natural limestone-derived materials (Samples B and C). Thereafter, the material was marked as Samples D, E, F, G and H.

Samples A through H were tested for $CO_2$ activity by carbonating each sample with pure $CO_2$ at one atmosphere (absolute) in a fluidized bed at 1500° F. for a predetermined period of time. The following table shows the results of these activity tests wherein the activity is expressed as the fractional amount of CaO which is converted to $CaCO_3$.

TABLE I

| | Composition prior to calcination (mol percent) | | |
|---|---|---|---|
| | $CaCO_3$ | $Ca(OH)_2$ | Activity |
| Calcined fresh South Dakota limestone, Sample A | 100 | | .66 |
| Calcined melts made from South Dakota limestone: | | | |
| Sample B | 47 | 53 | .62 |
| Sample C | 49 | 51 | .63 |
| Calcined melts from C.P. Reagent Chemicals: | | | |
| Sample D | 54 | 46 | .62 |
| Sample E | 50 | 50 | .66 |
| Sample F | 43 | 57 | .62 |
| Sample G | 36 | 64 | .61 |
| Sample H | 20 | 80 | .54 |

It can be seen from Table I that the activities of melts, as long as they originally contain 40 mole percent or more $CaCO_3$ (Samples B, C, D, E, and F), are substantially identical to that obtained from calcined fresh limestone (Sample A).

EXAMPLE B

Substantially inactive $CO_2$ acceptor was prepared by first passing fresh South Dakota limestone through the calcining step described in U.S. Pat. No. 2,705,672, and then through the gasification step described in said patent. This cyclical calcination-gasification procedure was repeated a total of 70 times. After the final gasification step, the $CaCO_3$-containing material was calcined to form CaO and then split into two portions. One portion (Sample I) was tested for activity in the manner set forth in Example A. The other portion was first treated with hot water at 300° F. for one hour to produce $Ca(OH)_2$. Thereafter, $CaCO_3 \cdot Ca(OH)_2 \cdot CaO$ was formed therefrom by mixing together the appropriate ingedients, melting the mixture in the manner previously set forth in Example A, solidifying the melt, and calcining the resultant solid materials. These latter samples, which were marked Samples J and K, were then tested for activity in the manner set forth in Example A.

The following table shows the results of testing Samples I, J and K.

TABLE II

| | Solidified melt composition prior to calcination (mol percent) | | | |
|---|---|---|---|---|
| | $CaCO_3$ | $Ca(OH)_2$ | CaO | Activity |
| Deactivated CaO, Sample I | | | | .16 |
| Calcined melt from deactivated CaO: | | | | |
| Sample J | 17 | 72 | 11 | .58 |
| Sample K | 18 | 73 | 9 | .54 |

It can be seen from Table II that the activity of the acceptor has increased three fold after being treated by the process of the present invention. Further, by comparing Table II with Table I, it can be seen that the activity of the regenerated acceptor is essentially indistinguishable from melts prepared from fresh materials. It is likely that the addition of $CO_2$ to the regenerated acceptor to increase the $CaCO_3$ content thereof (prior to melting and subsequent calcination) could further increase the activity of the regenerated acceptor until it would be substantially equal to the activity of calcined fresh limestone.

EXAMPLE C $Ca(OH)_2$ was prepared by calcining and then hydrating natural South Dakota limestone in the manner set forth in the example A. Thereafter it was mixed with natural limestone and heated to 1350° C. under 350 p.s.i.g. steam pressure until it was completely melted. After solidification in the manner set forth in example A, crushing and sizing were employed to obtain 16 x 28 mesh particles containing 50 mole percent $Ca(OH)_2$ and 50 mole percent $CaCO_3$. $Ca(OH)_2$ therein was then converted to CaO by heating to about 1000° C. at atmospheric pressure. This melt-derived acceptor material was then passed through the regeneration procedure described in U.S. Pat. No. 2,705,672 to completely convert it to CaO, and then passed through the gasification procedure described in said patent. Fresh South Dakota limestone (16 x 28 mesh) was also serially passed through the regeneration and gasification procedures described in said patent.

Table III below shows the operating conditions employed with these acceptors during gasification of 35 x 150 mesh devolatilized lignite char.

TABLE III

| | Calcined limestone acceptor | Melt-derived acceptor |
|---|---|---|
| General: | | |
| Gasification, regeneration pressure | (¹) | (¹) |
| Acceptor circulation rate (lb./hr.) | 5.23 | 6.53 |
| Gasifier Conditions: | | |
| Temperature, °F | 1,500 | 1,500 |
| Char feed rate (lb./hr.) | 1.6 | 1.6 |
| Char bed inventory, lb | 7.8 | 7.8 |
| Fluidizing velocity, ft./sec | 0.27 | 0.27 |
| Outlet gas composition from gasifier, vol. percent: | | |
| $H_2O$ | 20 | 20 |
| $H_2$ | 38 | 38 |
| $CH_4$ | 5 | 5 |
| CO | 10 | 10 |
| $CO_2$ | 6 | 6 |
| $N_2$ | 21 | 21 |
| Regenerator conditions: | | |
| Temperature, °F | 1,910 | 1,940 |
| Fluidizing Velocity ft./sec | 1.1 | 1.1 |
| Outlet gas composition from regenerator, vol. percent: | | |
| $CO_2$ | 17.5 | 20 |
| $N_2$ | 82.5 | 80 |

¹ 20 atm. absolute.

The operation simulates, in all details, a commercial $CO_2$ acceptor system with the exception that the heat of calcination in the regenerator was supplied electrically instead of by in situ char combustion.

During the operation of the continuous unit, the acceptor enters the gasifier in the fully calcined condition and is recarbonated on falling through the char bed. The driving force for recarbonation, i.e. $P_{CO_2}-(P_{CO_2})$ equil., is about 0.5–0.8 atmospheres and the residence time of the acceptor is about 7 minutes.

This cyclical calcination-gasification procedure was repeated many times for each material. The activity of each acceptor, measured as the moles $CaCO_3$ in the acceptor leaving the gasifier per total moles Ca in the acceptor leaving the gasifier, was periodically measured, and the following results were obtained:

TABLE IV

| | Activity | |
|---|---|---|
| | Fresh limestone-derived acceptor | Melt-derived acceptor |
| Cumulative number of calcination, gasification cycles: | | |
| 5 | .4 | .39 |
| 10 | .32 | .25 |
| 15 | .29 | .19 |
| 20 | .24 | .19 |
| 25 | .22 | .16 |
| 30 | .20 | .15 |
| 40 | .18 | .15 |

From Table IV it can be seen that the initial activities of the limestone and the melt acceptor are substantially identical. The melt declines more rapidly on cycling through the system. However, it should be noted from Table III that the regenerator temperature was about 30 F. higher in the melt acceptor run and this may be the cause of the more rapid decline in activity.

The higher temperature in the melt acceptor run was not accidental. The regenerator temperature was limited to 1910° F. in the limestone run to prevent agglomeration in the regenerator. The melt acceptor showed less tendency to agglomerate, which permitted an increase in regenerator temperature to 1940° F.

The run also demonstrated one of the other beneficial features of the melt acceptor, i.e. its high physical strength The attrition rate on passing the acceptor through the process was extremely small, i.e. much less than 0.5 weight percent/cycle.

While the process is well adapted to carry out the objects of the present invention, it is to be understood that various modifications and changes may be made all coming within the scope of the following claims.

What is claimed is:
1. A process for treating lime comprising
   (a) converting said lime to $Ca(OH)_2$, and forming a mixture of said $Ca(OH)_2$ with $CaCO_3$ and/or CaO;
   (b) heating said mixture in the presence of steam until said mixture is melted, said heating being conducted at an elevated pressure which is sufficiently high to prevent dehydration of said $Ca(OH)_2$ whereby a $Ca(OH)_2$-containing melt is formed;
   (c) allowing said melt to cool to a $Ca(OH)_2$-containing solid state material; and
   (d) calcining said solid material to convert said $Ca(OH)_2$ therein to CaO which is, at this point, an active $CO_2$ acceptor.

2. The process of claim 1 wherein said lime, prior to step (a), is employed as a $CO_2$ acceptor in a $CO_2$-producing process to thereby form $CaCO_3$ which $CaCO_3$ is thereafter calcined to regenerate CaO for reuse in said $CO_2$-producing process; and wherein said lime has become inert or less effective as a $CO_2$ acceptor after repeated calcination and reuse as a $CO_2$ acceptor in said $CO_2$-producing process.

3. The process of claim 2 in which said lime is converted to $Ca(OH)_2$ in step (a) of claim 1 by treatment of said lime with $H_2O$.

4. The process of claim 2 in which said cooling step (c) of claim 1 is accomplished by passing said melted mixture through a prilling tower to form solid droplets.

5. The process of claim 2 wherein said $CO_2$-producing process is a steam-carbon reaction process in which CO, $CH_4$, $H_2$ and $CO_2$ are produced.

6. The process of claim 2 wherein the pressure during melting of said mixture is about 9–30 atmospheres absolute.

7. The process of claim 2 wherein said conversion and mixing step (a) and melting step (b) of claim 1 are carried out by (a) mixing said lime with $CaCO_3$ in a pressurized reactor; and
(b) feeding a mixture of steam and $CO_2$ to said reactor while maintaining the pressure therein between about 350 and 1000 p.s.i.g. and the temperature between about 1200–1400° F., whereby part of said lime is converted to $Ca(OH)_2$ by reaction with said steam, and the remaining part is converted to $CaCO_3$ by reaction with said $CO_2$, the relative amounts of steam and $CO_2$ reacted being adjusted to yield a melt containing about 50 mole percent of $Ca(OH)_2$ and 50 mole percent of $CaCO_3$.

8. The process of claim 2 in which said melt contains $Ca(OH)_2$ and $CaCO_3$ in approximately 1:1 molar ratio.

9. The process of claim 8 wherein said steps (a) and (b) of claim 1 include mixing said lime with $CaCO_3$ in the presence of steam and $CO_2$.

10. The process of claim 9 in which said $CO_2$-producing process is a steam-carbon reaction process in which said CO, $CH_4$, $H_2$ and $CO_2$ are produced.

References Cited
UNITED STATES PATENTS

| | | | |
|---|---|---|---|
| 2,705,672 | 4/1955 | Gorin | 48—206 |
| 2,740,691 | 4/1956 | Burwell | 23—186 X |
| 2,807,529 | 9/1957 | Tarbox | 48—197 X |
| 3,115,394 | 12/1963 | Gorin et al. | 48—202 X |
| 3,194,644 | 7/1965 | Gorin et al. | 48—197 |

MORRIS O. WOLK, Primary Examiner

R. E. SERWIN, Assistant Examiner

U.S. Cl. X.R.

23—186; 48—202, 206